(12) United States Patent
Richter et al.

(10) Patent No.: US 9,355,351 B2
(45) Date of Patent: May 31, 2016

(54) SYSTEM FOR STORING INFORMATION RELATED TO OBJECTS AND FURTHER TRANSMITTING THE OBJECT INFORMATION TO USERS

(71) Applicant: R2Z Innovations, Inc., Vancouver (CA)

(72) Inventors: Wolfgang Richter, NW (DE); Faranak Zadeh, Vancouver (CA)

(*) Notice: Subject to any disclaimer, the term of this patent is extended or adjusted under 35 U.S.C. 154(b) by 269 days.

(21) Appl. No.: 14/292,912

(22) Filed: Jun. 1, 2014

(65) Prior Publication Data
US 2015/0347794 A1 Dec. 3, 2015

(51) Int. Cl.
G06K 7/10 (2006.01)
G06K 19/077 (2006.01)
G06K 19/07 (2006.01)
G06Q 30/06 (2012.01)

(52) U.S. Cl.
CPC ...... *G06K 19/07788* (2013.01); *G06K 19/0723* (2013.01); *G06Q 30/0623* (2013.01)

(58) Field of Classification Search
CPC .............. H04W 4/008; G06K 7/10366; G06K 19/07788; G06K 19/0723; G06F 3/04842; G06Q 30/0261; G06Q 10/087; G06Q 30/0623
See application file for complete search history.

(56) References Cited

U.S. PATENT DOCUMENTS

| | | | | |
|---|---|---|---|---|
| 2005/0234774 A1* | 10/2005 | Dupree | ................... | G06Q 30/02 705/14.57 |
| 2009/0204499 A1* | 8/2009 | Caswell | ................. | G06Q 20/20 705/14.25 |
| 2009/0207023 A1* | 8/2009 | Kushida | ............... | G06Q 10/087 340/572.1 |

* cited by examiner

*Primary Examiner* — An T Nguyen

(57) ABSTRACT

Disclosed is a system for storing information related to one or more objects and transmitting the object information to one or more users. The system includes first electronic circuitry, second electronic circuitry and third electronic circuitry. The first electronic circuitry interacts with one or more users and one or more objects. The second electronic circuitry capacitively coupled with first electronic circuitry and transmits the object information to the users via capacitive coupling. The third electronic circuitry capacitively coupled with first electronic circuitry via one or more users. The system further transmits the user related object information to one or more output devices.

6 Claims, 4 Drawing Sheets

SYSTEM FOR STORING INFORMATION RELATED TO OBJECTS AND FURTHER TRANSMITTING THE OBJECT INFORMATION TO USERS

BACKGROUND OF THE INVENTION

1. Field of the Invention

The present invention generally relates to a Smart Label System, and more specifically relates to a system for storing information related to objects and further transmitting the object information to users.

2. Description of Related Art

The use of advertising and marketing in human civilization dates back to ancient rock paintings found in many parts of Asia, Africa, and South America. Sales messages and wall posters have been known to be made by the ancient Egyptians for selling and promoting their products. Political campaign displays and commercial messages have also been found in the ruins ancient Arabia and the ancient Roman and Greek empires. Towns and cities in Europe during the middle ages have been known to have used visual signs and images to display the presence of a particular shop in the region.

In the modern era, advertisements on commercial television started sometime during the late 1940s. Sometime around the 1960s, commercial organizations started spending huge amounts of capital and other resources on focused advertisements and brand promotion. Advertising on the internet started sometime around the 1990s. Guerrilla marketing, involving interactive advertising where the viewer can respond to become part of the advertising message has gained a lot of importance in the present times.

In the marketplace, new ways of allowing a user to interact with the product, including methods for the user to gather information about the product have gathered impetus. New interactive methods such as provisions for RFIDs, barcodes, etc. allow the user to interact with the product and gather information about the product.

This procedure forces consumer to use scanning device or smart-phones and takes away the focus from the related product. The practice of keeping salesman, which is an alternative of the above mentioned procedure proves a costlier alternative for the sellers in the marketplace. Also, the present practice of having an electronic display with advertisements about the product during the entire day is a source of nuisance for anyone in the vicinity who is not interested in the product and is also a great wastage of electricity and other resources.

Hence, there is a need for a method and system that allows the user to interact with the object in a dynamic audio-visual manner that would allow the user to know more about the object via audio-visual means, without sacrificing the element of proximity with the object. There is a need of a system and method which allows the user to interact with the object on a one-on-one basis, without the need of a salesman. Also, there is a need to design the above mentioned system in such a way that it activates only when the user interested in the object in question is in the proximity of the object.

SUMMARY OF THE INVENTION

In accordance with the teachings of the present invention, a system for storing information related to one or more objects and further transmitting the object information to one or more users is provided.

An object of the present invention is to provide a system for storing information related to one or more objects and further transmitting the object information to one or more users. The system includes at least one first electronic circuitry to interact with at least one or more users and at least one or more objects.

The first electronic circuitry includes an energizer to generate an AC electric field, a first computing element storing a unique identification information (LHID) and further connected to the energizer, a first communicating device connected to the energizer and further feeds the unique identification information (LHID) to AC electric field to generate a modulated AC electric field and a first electrode connected to energizer to distribute the modulated AC electric field over its surface for detecting the presence of one or more users and at-least one second electronic circuitry capacitively coupled with first electronic circuitry and further transmits object information to users via capacitive coupling.

The second electronic circuitry includes a second electrode capacitively coupled with first electrode and user to sense the modulated AC electric field altered by the presence of one or more users, a first energy converter connected to second electrode to convert the modulated AC electric field received from the second electrode into DC electric energy, a third electrode coupled for floating modulated alternating electric field with respect to the ground on sensing the presence of user, a second energy converter connected to third electrode for converting the modulated AC electric field energy received from third electrode into DC electric energy, a first buffer connected to the first energy converter and the second energy converter to store the DC electric energy, a second computing element receiving energy from the first buffer and stores object information related to the objects.

The second computing element further measures the change in AC electric field from second electrode and third electrode for detecting the proximity of one or more users with at least one or more objects, a second communication device connected to the second electrode and the second computing element sends object information of at least one object via modulating alternating electric field on detecting closeness of the user with at least one object to the first communication device and a first output device connected to the second computing element to provide the object information to the users. The output device further provides the object information identified by the first computing element.

The first computing element identifies the location of the user and the one or more objects by combining the unique identification number (LHID) with the object information received from the second communication device to generate the user related object information. The system further connected to the one or more second output devices. Further, the first electronic circuitry includes a first communication device for receiving and transmitting the user related object information from the first computing element and the second output devices, respectively.

The system further includes a third electronic circuitry capacitively coupled to the second electronic circuitry and first electronic circuitry. The third electronic circuitry capacitively coupled with first electronic circuitry for identifying the location of the user. The third electronic circuitry includes a third computing element for storing user information (UID), a third communicating device for transmitting user information stored in third computing element via the user to the first communicating device, a fourth electrode capacitively coupled with the second electrode and third electrode for distributing the user information via user's skin to the second communicating device, a field activated switch for controlling the third communicating device, a fifth electrode connected to the field activated switch for floating with respect to ground, and a first buffer acting as a source of electrical energy for the third computing element, the third communicating device, the field activated switch, the fourth electrode and the fifth electrode.

The first computing element combines the user information with the object information to identify the user and further determining location of the user by measuring change in alternating electric field and further transmitting the user related object information to the first output device.

The third electronic circuitry further includes a second communication device connected to the third computing element for receiving the user related object information from the second computing element and further providing the user related object information to the one or more second output devices.

The third electronic circuitry further includes a third output device for playing the user related information initiated from either of the first computing element or the second computing element or the third computing element.

Another object of the present invention is to provide one or more sixth electrodes connected to the first electrode to detect the proximity of at least one user. The first computing element compares the variation of the modulated alternating electric field on the surface of the first electrode and the one or more sixth electrodes for determining the proximity of the at least one user with the object.

Another object of the present invention is to provide the first electronic circuitry capacitively coupled with the third electronic circuitry via the user's skin. The first computing element stores the object information and the unique identification information (LHID) and the third computing element stores the user information. The first computing element combines the user information with the unique identification information to identify and determining the location of the user and further transmitting the user related object information to the second output device.

Another object of the present invention is to provide the second electronic circuitry capacitively coupled with the third electronic circuitry via the user's skin. The second computing element stores both the object information and the unique identification information and the third computing element stores user information. Further, the second electronic circuitry includes at least one sixth electrode connected to the second electrode to detect the proximity of the user.

The second computing element combines the user information with the object information to identify and further determining the proximity of the user with the object from unique identification information. The second computing element then transmits the object related user information to the first output device via the third communicating device.

Another object of the present invention is to identify the users in an alternating electric field environment utilizing the first electronic circuitry and one or more third electronic circuitries. For example, the user carries the third electronic circuitry in a tradeshow. One or more sixth electrodes are placed in the tradeshow. The one or more sixth electrodes are connected to the first electronic circuitry that helps in counting the number of users in the tradeshow. The first electronic circuitry identifies the one or more users by detecting the user information of their respective third electronic circuitry via the sixth electrode.

Thus, either on the basis of location, speed or direction of the user, the first electronic circuitry transmits the object information to the users on their respective third electronic circuitry. For example in the tradeshow, the user's third electronic circuitry may be notified by the first electronic circuitry with the user related object information such as "go right to see the details of an object on stand". Similarly, for other users their respective third electronic circuitry is notified by the first electronic circuitry.

Another object of the present invention is to identify the users in an alternating electric field environment utilizing the second electronic circuitries and one or more third electronic circuitries. For example, in a store numbers of objects are placed on a shelf. Each of the objects has a separate second electronic circuitry and stores information related to respective products. The series of sixth electrode identify the location of each user. On identifying the location of the users near to the products, the second electronic circuitry releases the object information for the third electronic circuitry respectively. In another exemplary embodiment, the third electronic circuitries may further transmit the object information to the second output device.

Further, a user approaches the object having second electronic circuitry. The user is detected via sixth electrode and the user related information is displayed on the second electronic circuitry. For example, the user being the first time in the shop may get a welcome message or an attractive offer from the second electronic circuitry.

Another object of the present invention is to provide the field activated switch connected to the fifth floating electrode. The fifth floating electrode of the third electronic circuit further senses the electric field. The fifth floating electrode is further connected to a filter which only allows the electric field of a particular frequency to pass through. The filter is further connected to a rectification apparatus that converts the AC electric field to the DC electric power. The DC electric power is further buffered by a buffering apparatus. An external control signal is connected to the buffering apparatus to control it discharging for open the switch after (or at) a certain time period. This DC buffered electric field is further provided to a switching apparatus. The switching apparatus is initially in the open switch configuration, on receiving the DC buffered electric filed for at least a limiting period of time the switching apparatus changes its configuration from the open switch configuration to a close switch configuration. On entering the closed switch configuration the switching apparatus complete the circuit. Hence the field activated switch recovers and activates at least the communication of said third electronic circuitry from stand by or sleep mode.

The AC electric filed has a particular modulation pattern and the filter only allows electric filed with the particular modulation to pass through. The Switching apparatus in the present embodiment of the invention is an electronic construction that possesses to modes: a stand-by/sleep and an activated mode.

These and other objects, features and advantages of the invention will become more fully apparent in the following detailed description, taken in conjunction with the accompanying drawings.

BRIEF DESCRIPTION OF THE INVENTION

Figure 3:
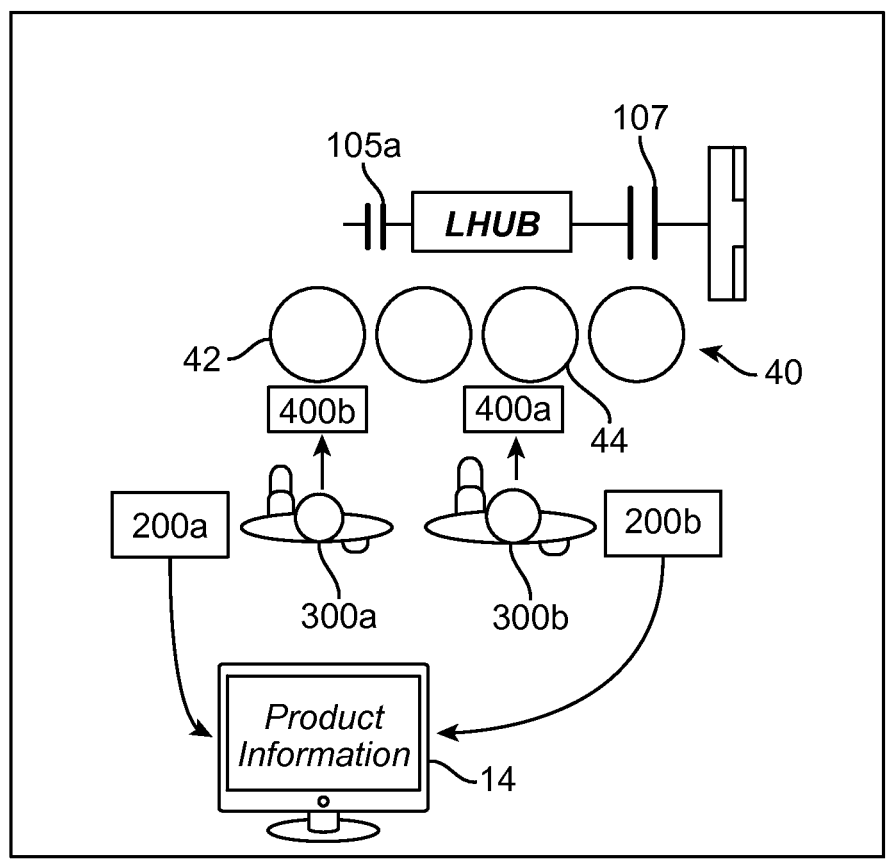
Figure 4:
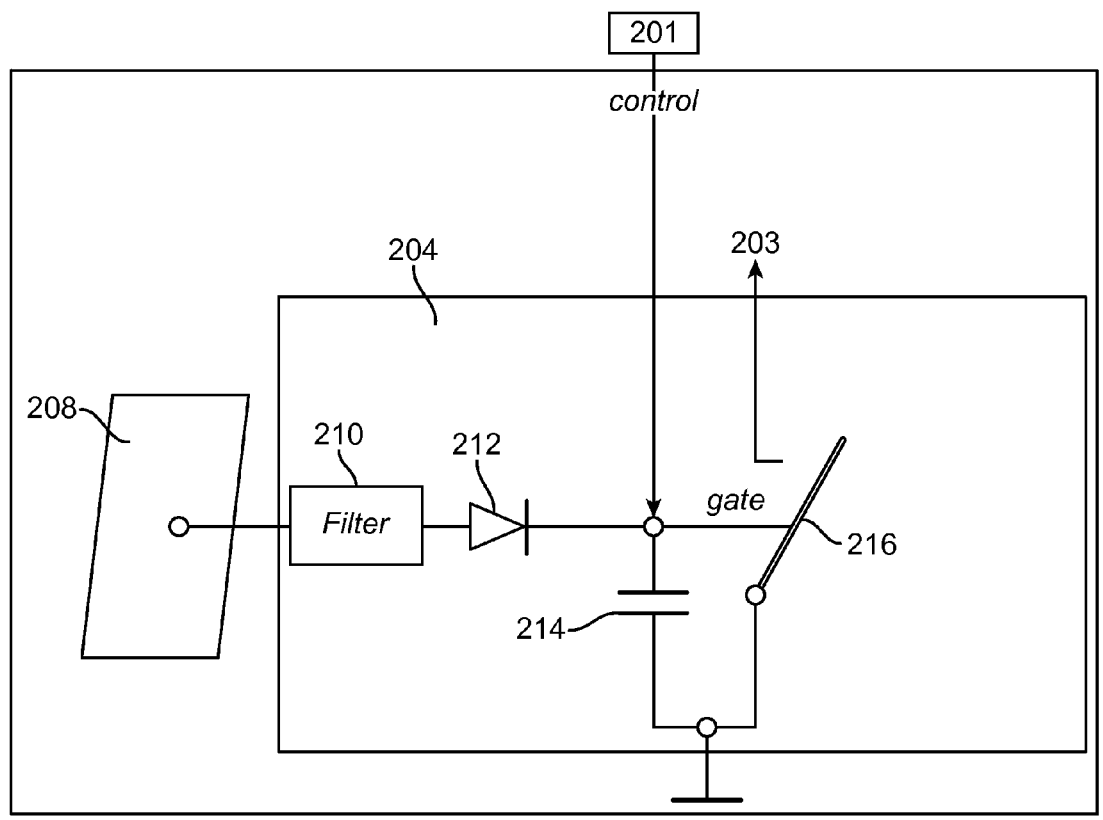

FIG. 3 illustrates another exemplary embodiment of the present invention identifying the users in an alternating electric field environment utilizing the second electronic circuitries and one or more third electronic circuitries; and FIG. 4 illustrates a block diagram of a field activated switch connected to the fifth floating electrode in accordance with a preferred embodiment of the present invention.

DETAILED DESCRIPTION OF THE INVENTION

While this technology is illustrated and described in a preferred embodiment, system for storing information related to one or more objects and further transmitting the object information to one or more users may be produced and described in many different configurations, forms and various methods, without deviating from the scope of present invention. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
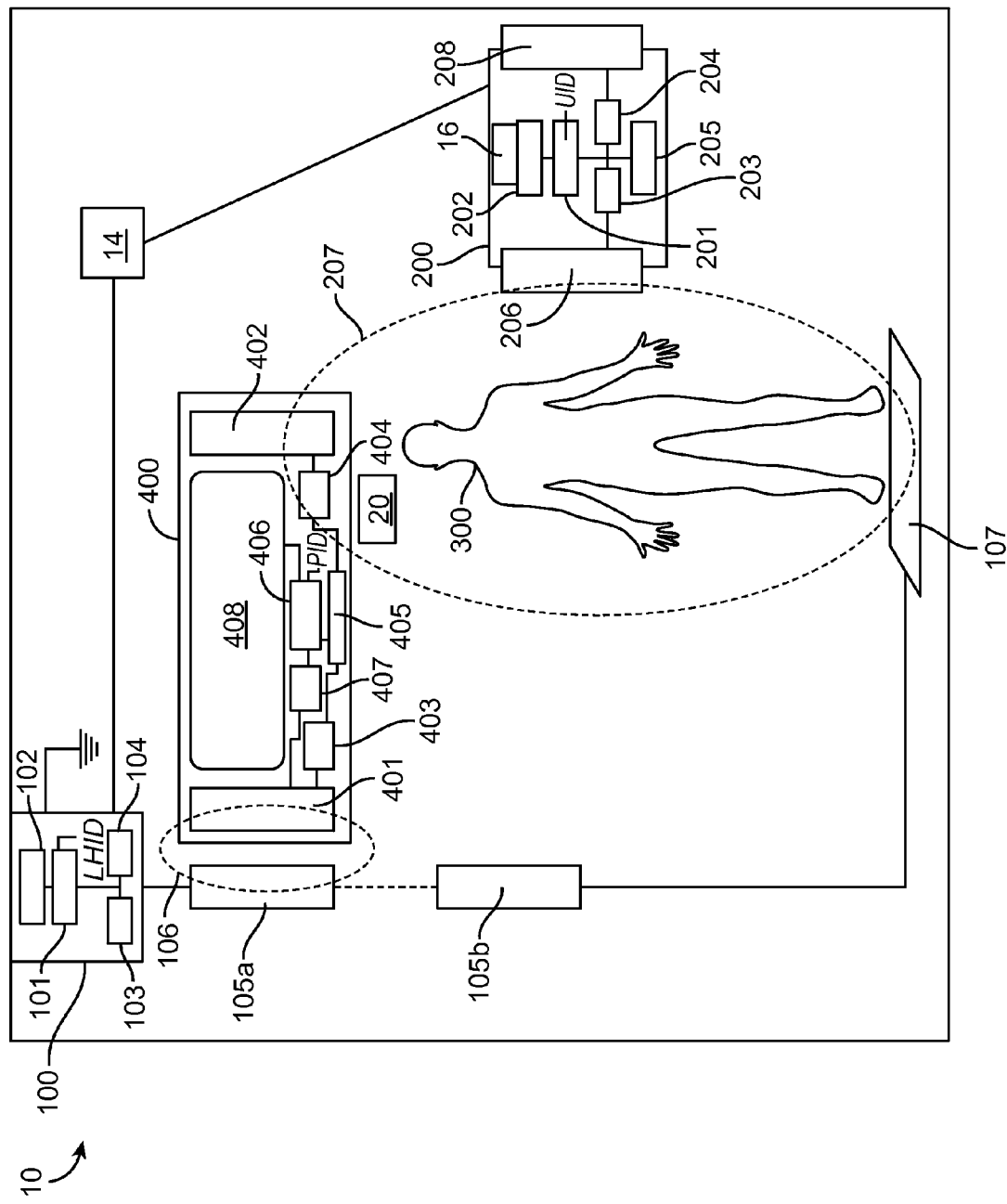
FIG. 1 illustrates a block diagram of a system of a first electronic circuitry; a second electronic; and a third electronic circuitry in a preferred embodiment of the present invention.

FIG. 1 illustrates a block diagram of a system 10 includes a first electronic circuitry 100 and a second electronic circuitry 400 interacting with the user 300. It must be noted that the objective of the present invention is to provide the system 10 for storing information related to one or more objects and further transmitting the object information to one or more users, such as user 300. The transmission of object information related to one or more objects to the user 300 is explained in FIG. 3 of the present invention.

In a preferred embodiment of the present invention, the first electronic circuitry 100 and the second electronic circuitry 400 is combined to form a first integrated system 10. The first electronic circuitry 100 to interact with at least one user 300 and at least one or more objects such as object 20. The first electronic circuitry 100 includes an energizer 103 to generate an AC electric field, a first computing element 101 containing an unique identification information (LHID) and further connected to the energizer 103, a first communicating device 104 connected to the energizer 103 and further feeds the unique identification information (LHID) to AC electric field to generate a modulated AC electric field, and a first electrode 105a connected to the energizer 103 to distribute modulated AC electric field over its surface for detecting the presence of at least one of one or more users, such as user 300.

The second electronic circuitry 400 capacitively coupled with the first electronic circuitry 100 for transmitting the object information to the one or more users such as user 300 via capacitive coupling. The second electronic circuitry 400 includes a second electrode 401 capacitively coupled with first electrode 105a to sense the modulated AC electric field altered by the presence of the user 300, a first energy converter 403 for converting the modulated AC electric field received from the second electrode 401 into DC electric energy.

Further, the second electronic circuitry 400 includes a third electrode 402 coupled for floating modulated alternating electric field with respect to the ground on sensing the presence of the user 300, a second energy converter 404 for converting the modulated AC electric field energy received from the third electrode 402 into DC electric energy, a first buffer 405 connected to the first energy converter 403 and the second energy converter 404 to store DC electric energy, a second computing element 406 receiving energy from the first buffer 405 and stores object information related to one or more objects, such as object 20.

The second computing element 406 measures the change in AC electric field from the second electrode 401 and the third electrode 402 for detecting the proximity of the user 300 with the object 20. Further, the first computing element 101 identifies the location of the user 300 and the one or more objects such as object 20 by combining the unique identification information (LHID) with the object information received from the second computing element 406.

The second electronic circuitry 400 further includes a second communicating device 407 connected to the second electrode 401 and the second computing element 406 for sending the object information of the object 20 via modulating alternating electric field on detecting closeness of the user 300 with the object 20 to the first communicating device 104. Further, the second electronic circuitry 400 includes a first output device 408 to play user related object information identified by the first computing element 101.

Further, the first computing element 101 identifies the location of the user 300 and the one or more objects such as object 20 by combining the unique identification number with the object information received from the second communicating device 407 to generate the user related object information.

In another preferred embodiment of the present invention the system 10 further connected to the one or more second output devices such as second output device 14. Further, the first electronic circuitry 100 includes a first communication device 102 for receiving and transmitting the user related object information from the first computing element 101 and the one or more second output devices 14, respectively.

In another preferred embodiment of the present invention system 10 further includes a third electronic circuitry 200 capacitively coupled to the second electronic circuitry 400 and first electronic circuitry 100. The third electronic circuitry 200 capacitively coupled with first electronic circuitry 100 for identifying the location of the user 300. The third electronic circuitry 200 includes a third computing element 201 for storing user information (UID), a third communicating device 203 for transmitting user information stored in third computing element 201 via the user 300 to the first communicating device 104, a fourth electrode 206 capacitively coupled with the second electrode 401 and third electrode 402 for distributing the user information via user 300 skin to the second communicating device 407, a field activated switch 204 for controlling the third communicating device 203, a fifth electrode 208 connected to the field activated switch 204 for floating with respect to ground, and a first buffer 405 acting as a source of electrical energy for the third computing element 201, the third communicating device 203, the field activated switch 204, the fourth electrode 206 and the fifth electrode 208.

The first computing element 101 combines the user information with the object information to identify the user 300 and further determining location of the user 300 by measuring change in alternating electric field and further transmitting the user related object information to the first output device 408.

In another preferred embodiment of the present invention, the third electronic circuitry 200 further includes a second communication device 202 connected to the third computing element 201 for receiving the user related object information from the second computing element 406 and further providing the user related object information to the one or more second output devices such as second output device 14.

In another preferred embodiment of the present invention the third electronic circuitry 200 further includes a third output device 16 for playing the user related information initiated from either of the first computing element 101 or the second computing element 406 or the third computing element 201.

In another preferred embodiment of the present invention, the system 10 further includes one or more sixth electrodes such as 107 and 105b connected to the first electrode 105a to detect the proximity of at least one user i.e. user 300, wherein the first computing element 101 compares the variation of the modulated alternating electric field on the surface of the first electrode 105a or the one or more sixth electrodes 107 or 105b for determining the proximity of the at least one user 300 with at least one of the object 20. In another preferred embodiment of the present invention, if the user 300 carries a third electronic circuitry 200 its field activated switch 204 may receive a command via said electrodes 104b or 107 capacitively coupled to the fifth electrode 208 to activate at least the communication device 203 or other sub circuits of 200.

Examples of user information (UID) includes but not limited to numeric data, alphabetical data, ASCII data, or any type of data that may be used to provide unique ID for the third electronic circuitry. The user information may include information related to IP address of the third communication device 203. However, it would readily apparent to those skilled in the art that other information may also be stored as user information in the third computing element 201.

The energizer 103 in the first electronic circuitry includes but not limited to any electrical or electronic embodiment that may be used to generate an AC or DC pulsed electric field. Example of energizer 103 includes but not limited to a combination of a hard-or-software oscillator (e.g. PWM) and level shifter (e.g. inductor, transformer, convertor, resonator etc).

The computing elements 101, 201 and 406 includes but not limited to a microprocessor, a microcontroller or FPGA or system-on-chips (SoC) etc any other electrical or electronic embodiment that may be used for performing arithmetic and logic operations. The unique identification information (LHID) in the first electronic circuitry 100 includes but not limited to numeric data, alphabetical data, ASCII data, combination of two or more than two combination data or any other type of data that can be used to provide unique ID for the first electronic circuitry 100.

The communication devices such as first communication device 102 and the second communication device 202 include but not limited to Wi-Fi devices, Bluetooth devices, USB cables and other means for exchanging data. The communicating devices 104, 407 and 204 but not limited to any electric and electronic equipment that feed information to the AC electric field generated by the energizer 103 and hence produce a modulating electric field. Examples of the communicating devices 104, 407 and 204 include but not limited to AM, FM or load modulators, or alternators and related demodulators.

The energy converters 403 and 404 includes but not limited to any electrical or electronic embodiments that can be used as to convert AC energy into DC energy. Examples of energy converters 403 and 404 include but not limited to diodes, rectifiers, synchronous switches, cascades etc. The buffers 205 and 405 include but are not limited to any electrical or electronic embodiments that can be used as to store energy such as battery or capacitors or silicon batteries etc.

In another preferred embodiment of the present invention, the first electronic circuitry 100 is capacitively coupled with the third electronic circuitry 200 via the user 300. The first computing element 101 stores the object information and the unique identification information (LHID) and the third computing element 201 stores the user information.

The first computing element 101 combines the user information with the unique identification information to identify and determining the location of the user 300 and further transmitting the user related object information to the second output device 14. An exemplary embodiment of the capacitive coupling of the first electronic circuitry 100 with the third electronic circuitry 200 is explained in detail in conjunction with FIG. 2 of the present invention.

In another preferred embodiment of the present invention, the second electronic circuitry 400 is capacitively coupled with the third electronic circuitry 200 via the user 300. The second computing element 406 stores both the object information and the unique identification information and the third computing element 201 stores user information. Further, the second electronic circuitry 400 includes at least one sixth electrode 105b or 107 connected to the second electrode 401 to detect the proximity of the user 300.

The second computing element 406 combines the user information with the object information to identify and further determining the proximity of the user with the object 20 from unique identification information. The second computing element 406 then transmits the object related user information to the first output device 408 via the third communicating device 203. An exemplary embodiment of the capacitive coupling of second electronic circuitry 400 with the third electronic circuitry 200 is explained in detail in conjunction with FIG. 3 of the present invention.

Examples of the third electronic circuitry 200 includes but not limited to phones, tablet computers, laptops, computers or any other electronic device. Examples of the transmission of the user related information from the one or more communication devices such as first communication device 102 and the second communication device 202 to the one or more output device such as first output device 408, second output device 14 and third output device 16 include but not limited to messages, e-mails, pre-recorded calls, videos etc.

Figure 2:
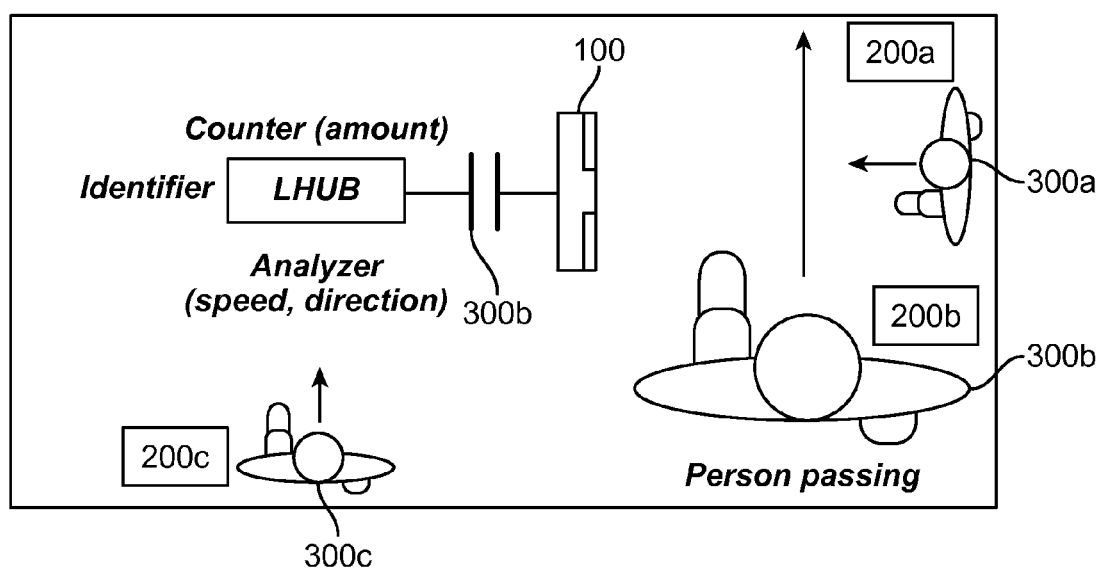
FIG. 2 illustrates an exemplary embodiment of present invention identifying the users in an alternating electric field environment utilizing the first electronic circuitry and one or more third electronic circuitries.

FIG. 2 illustrates an exemplary embodiment of present invention identifying the users 300a, 300b and 300c (hereinafter collectively termed as users 300) in an alternating electric field environment utilizing the first electronic circuitry 100 and one or more third electronic circuitries such as 200a, 200b and 200c (hereinafter collectively termed as third electronic circuitry 200). For example, the user 300a carries the third electronic circuitry 200a in a tradeshow. One or more sixth electrodes such as 107 are placed in the tradeshow. The one or more sixth electrodes are connected to the first electronic circuitry 100 that helps in counting the number of users in the tradeshow.

The first electronic circuitry 100 identifies the users 300, such as user 300a, 300b and 300c. In a preferred embodiment of the present invention, the first electronic circuitry 100 identifies the one or more users 300 by detecting the user information of their respective third electronic circuitry 200 via the sixth electrode 107.

Thus, either on the basis of location, speed or direction of the user, the first electronic circuitry 100 transmits the object information to the users 300 such as 300a, 300b and 300c on their respective third electronic circuitry 200 such as 200a, 200b and 200c. For example in the tradeshow, the user's 300a third electronic circuitry 200a may be notified by the first electronic circuitry 100 with the user related object information such as "go right to see the details of an object on stand 1". Similarly, for other users such as 300b and 300c their respective third electronic circuitry 200b and 200c are notified by the first electronic circuitry 100.

FIG. 3 illustrates another exemplary embodiment of the present invention identifying the users 300a and 300b (hereinafter collectively termed as users 300) in an alternating electric field environment utilizing the second electronic circuitries such as 400a, 400b and 400c (hereinafter collectively termed as second electronic circuitry 400) and one or more third electronic circuitries such as 200a, 200b and 200c (hereinafter collectively termed as third electronic circuitry 200). In a preferred embodiment, the first electronic circuit 400 may be integrated in a retail shelf label where the output device 408 is realized as a display (LCD, OLED, EINK, Electroluminescent etc.) such "smart Label" would also measure the number, direction and speed of the passing users for analyzing purposes. It may divide registered users (carrying an activated 200 from others) which makes the system useful in many aspects (e.g. shop planning, bottleneck or queuing avoidance etc.)

For example, in a store number of objects 40 such as object 40a and object 40b are placed on a shelf. Each of the objects 40 has a separate second electronic circuitry 400, such as 400a and 400b and stores information related to respective products 40. Examples of objects 40 include but not limited to glass, brush, bottles etc. The series of sixth electrode such as 107 and 105a identifies the location of each user such as 300a, 300b. On identifying the location of the users 300 near to the products 40, the second electronic circuitry 400 such as 400a and 400b releases the object information for the third electronic circuitry 200a and 200b respectively. In another exemplary embodiment, the third electronic circuitries 200 may further transmit the object information to the second output device 14.

Further, a user 300b approaches the object 44 having second electronic circuitry 400b. The user 300b is detected via sixth electrode 107 and the user related information is displayed on the second output device 14. The user 300b being the first time in the shop may get a welcome message or an attractive offer from the second electronic circuitry 400b.

FIG. 4 illustrates an exemplary embodiment of the present invention illustrating the field activated switch 204 connected to the fifth floating electrode 208. In the present embodiment the fifth floating electrode 208 senses the electric field. The fifth floating electrode 208 is further connected to a filter 210 which only allows the electric field of a particular frequency to pass through. The filter 210 is further connected to a rectification apparatus 210 that converts the AC electric filed to the DC electric field. The DC electric field is further buffered by a buffering apparatus 214 to control DC buffer charge field. An external control signal from the third computing element (not shown in FIG. 4) is utilized by the buffering apparatus 214 to generate the DC buffered electric field. This DC buffered electric filed is further provided to a switching apparatus 216. The switching apparatus 216 is initially in the open switch configuration, on receiving the DC buffered electric filed for at least a limiting period of time the switching apparatus 216 changes its configuration from the open switch configuration to a close switch configuration. On entering the closed switch configuration the switching apparatus 216 complete the circuit. Hence the field activated switch 204 recovers from stand by or sleep mode to activate third communicating device 203 or second electronic circuitry.

In another embodiment of the present invention the AC electric filed has a particular modulation pattern and the filter 210 only allows electric filed with the particular modulation to pass through. The switching apparatus 216 in the present embodiment of the invention is electronic constructions that possess to modes: a stand-by/sleep and an activated mode. The switching apparatus 216 may be physically constructed by utilizing a number of electronic elements in conjunction including but not limited to diodes, triodes, IGBT, SCR, MOSFET, FET etc.

The information provided by second electronic circuitry 400 which may or may not be useful for one or more users includes but not limited to information informing the users about a product, a collection of product, a physical construct where a collection of products are available. In the present embodiment on the activation of third electronic circuitry 200, the first electronic circuitry 100 can identify one or more users and output user specific information from the second electronic circuitry.

The present invention finds its application in places of interest including but not limited to shops, offices, trade centers, malls, supermarkets, co-operative societies, hotels, restrooms, washrooms, toilets, homes and any other places of interest where at least one user may be provided a chance for interaction with at least one object for purposes, including but not limited to the sale, brand promotion, general promotion or services/goods related promotion of objects or services that may or may not include the transactions involving different financial or non-financial means.

It must also be noted that the present invention deals with system for storing information related to one or more objects and further transmitting the object information to one or more users. It includes cases where the motion of one or more user is being tracked and their presence and/or motion is being detected and further they are being provided with a system to interact with one or more objects.

As required, the detailed embodiments of the present system for storing information related to one or more objects and further transmitting the object information to one or more users, have been included herein. However, it must be understood that the disclosed embodiments are merely exemplary of the system storing information related to one or more objects and further transmitting the object information to one or more users, which may be embodied in various forms. Therefore, the structural and functional details that have been disclosed should not be interpreted as limiting. They must merely be taken as the basis for the claims and as a representative basis for teaching one skilled in the specific domain to variously employ the present invention in virtually any appropriately detailed structure. Further, the terms, phrases and examples used herein are not intended to be limiting, but are rather are intended to provide an understandable description of the invention.

We claim:

1. A system for storing information related to one or more objects and further transmitting the object information to one or more users, the system comprising:
    at least one first electronic circuitry to interact with at least one of said one or more users and at least one of said one or more objects, said first electronic circuitry comprising:
        an energizer to generate an AC electric field;
        a first computing element includes an unique identification information (LHID) and further connected to said energizer;
        a first communicating device connected to said energizer and further feeds the unique identification information (LHID) to said AC electric field to generate a modulated AC electric field; and
        a first electrode connected to said energizer to distribute said modulated AC electric field over its surface for detecting the presence of at least one of said one or more users; and
    at least, one second electronic circuitry capacitively coupled with said first electronic circuitry and further transmits object information to said one or more users via capacitive coupling, said second electronic circuitry comprising:
- a second electrode capacitively coupled with said first electrode via user's skin to sense the modulated AC electric field altered by the presence of said one or more users;
- a first energy converter connected to said second electrode to convert the modulated AC electric field received from the said second electrode into DC electric energy;
- a third electrode coupled for floating modulated alternating electric field with respect to the ground on sensing the presence of said user;
- a second energy converter connected to said third electrode for converting the modulated AC electric field energy received from said third electrode into DC electric energy;
- a first buffer connected to said first energy converter and said second energy converter to store said DC electric energy;
- a second computing element receiving energy from said first buffer and stores object information related to said one or more objects, further said second computing element measures the change in AC electric field from said second electrode and said third electrode for detecting the proximity of said one or more users with at least one of said one or more objects;
- a second communicating device connected to said second electrode and said second computing element sends object information of at least one object via modulating alternating electric field on detecting closeness of said user with at least one object to said first communicating device; and
- a first output device connected to said second computing element to play user related object information identified by said first computing element;

wherein said first computing element identifies the location of the user and the one or more objects by combining the unique identification information with the object information received from said second communicating device to generate the user related object information.

2. The system according to claim 1 further connected to one or more second output devices wherein said first electronic circuitry further comprising a first communication unit for receiving the user related object information from said first computing element and further transmitting the user related object information to the one or more second output devices, wherein said one or more second output devices play the user related object information.

3. The system according to claim 1 further comprising a third electronic circuitry capacitively coupled with said first electronic circuitry and said second electronic circuitry through said user's skin, said third electronic circuitry comprising:
- a third computing element for storing user information (UID);
- a third communicating device for transmitting user information stored in said third computing element via said user;
- a fourth electrode capacitively coupled with said second electrode and said third electrode for distributing the user information through said user's skin to said second communicating device;
- a field activated switch for controlling said third communicating device;
- a fifth electrode connected to said field activated switch for floating with respect to ground; and
- a second buffer acting as a source of electrical energy for said third computing element, said third communicating device, said field activated switch, said second electrode and said third electrode;

wherein said first computing element combines the user information with the object information to identify the user and further determining location of user and object by measuring change in alternating electric field and further said first computing element to transmit user related object information to said first output device.

4. The third electronic circuitry according to claim 3 further comprising a second communication device connected to said third computing element for receiving the user related object information from said second computing element and further providing the user related object information to said one or more second output devices.

5. The third electronic circuitry according to claim 3 further comprising a third output device for playing the user related information initiated from at least one of:
said first computing element; said second computing element; and third computing element.

6. The system according to claim 1 further comprising at least one sixth electrode connected to said first electrode to detect the proximity of at least one user; wherein said first computing element to compare the variation of modulated alternating electric field on the surface of said first electrode and said at least one of the sixth electrode to determine the proximity of said at least one user with at least one of the object.

* * * * *